US009383466B2

(12) United States Patent
van Groenestijn et al.

(10) Patent No.: US 9,383,466 B2
(45) Date of Patent: Jul. 5, 2016

(54) PRIMARY ESTIMATION ON OBC DATA AND DEEP TOW STREAMER DATA

(75) Inventors: Gert-Jan A. van Groenestijn, Voorschoten (NL); Warren S. Ross, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 568 days.

(21) Appl. No.: 13/989,754

(22) PCT Filed: Oct. 13, 2011

(86) PCT No.: PCT/US2011/056163
§ 371 (c)(1),
(2), (4) Date: May 24, 2013

(87) PCT Pub. No.: WO2012/074612
PCT Pub. Date: Jun. 7, 2012

(65) Prior Publication Data
US 2013/0242696 A1    Sep. 19, 2013

Related U.S. Application Data

(60) Provisional application No. 61/418,690, filed on Dec. 1, 2010, provisional application No. 61/526,541, filed on Aug. 23, 2011.

(51) Int. Cl.
*G01V 1/38* (2006.01)
*G01V 1/36* (2006.01)

(52) U.S. Cl.
CPC ............... *G01V 1/368* (2013.01); *G01V 1/364* (2013.01); *G01V 2210/56* (2013.01); *G01V 2210/614* (2013.01)

(58) Field of Classification Search
CPC ........... A61N 1/37264; A61N 1/36185; A61N 1/37235; A61N 1/37247; A61N 1/36006; A61N 1/36007; A61N 1/36071; A61N 1/36082; A61M 5/1723; A61M 5/14276; A61M 2201/054; G06F 19/3406; G06F 19/3437
See application file for complete search history.

(56) References Cited

U.S. PATENT DOCUMENTS 5,729,506 A   3/1998  Dragoset, Jr.
6,101,448 A   8/2000  Ikelle
(Continued)

FOREIGN PATENT DOCUMENTS

EP   1 358 618   11/2003
EP   2 141 514    1/2010
(Continued)

OTHER PUBLICATIONS

Amundsen, L. (1999), "Free-surface multiple attenuation of four-component (4C) sea floor recordings," *SEG Expanded Abstracts*, pp. 868-871.
(Continued)

*Primary Examiner* — Krystine Breier
(74) *Attorney, Agent, or Firm* — ExxonMobil Upstream Research Company, Law Dept.

(57) ABSTRACT

Method for correcting OBC or deep-towed seismic streamer data for surface-related multiple reflections. The measured pressure data, preferably after conditioning (71), are simulated using a forward model that includes a water propagation operator between source locations and receiver locations and a term representing primary impulse responses (72). Other terms include direct arrivals and source wavelets. Iterative optimization of an objective function is used to minimize the difference between measured and simulated data, updating the primary impulse response term and optionally the source wavelets term each iteration cycle (73). The converged primary impulses (74) are used to construct simulated multiples and direct arrivals (75), which can be subtracted from the measured data. Optionally the measured data might be blended during the forward simulation (72), to save computational costs in the forward simulation (72) and in the inversion (73).

22 Claims, 11 Drawing Sheets

(56) References Cited

U.S. PATENT DOCUMENTS

| | | | |
|---|---|---|---|
| 6,169,959 B1 | 1/2001 | Dragoset, Jr. | |
| 6,606,278 B2 | 8/2003 | Lee et al. | |
| 6,654,693 B2 | 11/2003 | Sen | |
| 6,678,207 B2 | 1/2004 | Duran | |
| 6,691,039 B1 | 2/2004 | Wood | |
| 6,721,662 B2 | 4/2004 | Wood | |
| 6,735,528 B2 | 5/2004 | Wood et al. | |
| 6,987,706 B2 | 1/2006 | Wood | |
| 6,999,880 B2 * | 2/2006 | Lee | G01V 1/30 702/13 |
| 7,286,938 B2 | 10/2007 | Amundsen et al. | |
| 7,295,490 B1 * | 11/2007 | Chiu | G01V 1/005 367/41 |
| 7,366,054 B1 | 4/2008 | Wood | |
| 7,379,386 B2 | 5/2008 | Muyzert et al. | |
| 7,382,682 B2 | 6/2008 | Zerouk | |
| 7,382,684 B2 | 6/2008 | Love et al. | |
| 7,408,936 B2 | 8/2008 | Muyzert et al. | |
| 7,466,625 B2 | 12/2008 | Robertsson et al. | |
| 7,505,362 B2 | 3/2009 | Anderson et al. | |
| 7,523,003 B2 | 4/2009 | Robertsson et al. | |
| 7,564,740 B2 | 7/2009 | Wood | |
| 7,584,057 B2 | 9/2009 | Ozbek et al. | |
| 7,599,251 B2 | 10/2009 | Love et al. | |
| 7,675,812 B2 | 3/2010 | Ferris | |
| 7,710,821 B2 | 5/2010 | Robertson | |
| 7,768,869 B2 | 8/2010 | van den Berg et al. | |
| 7,791,980 B2 | 9/2010 | Robertsson et al. | |
| 7,881,154 B2 | 2/2011 | Pica | |
| 7,948,826 B2 | 5/2011 | Wood | |
| 8,077,543 B2 | 12/2011 | Van Manen et al. | |
| 8,121,823 B2 | 2/2012 | Krebs et al. | |
| 2005/0135188 A1 | 6/2005 | Wood | |
| 2006/0098529 A1 * | 5/2006 | Anderson | G01V 1/28 367/38 |
| 2006/0291328 A1 * | 12/2006 | Robertsson | G01V 1/36 367/24 |
| 2008/0015783 A1 | 1/2008 | Robertsson et al. | |
| 2008/0033655 A1 | 2/2008 | Ozbek et al. | |
| 2008/0205196 A1 | 8/2008 | Love et al. | |
| 2008/0259726 A1 * | 10/2008 | van Manen | G01V 1/36 367/24 |
| 2009/0005999 A1 | 1/2009 | Wood et al. | |
| 2009/0214663 A1 | 12/2009 | Stewart | |
| 2010/0149917 A1 * | 6/2010 | Imhof | G01V 1/32 367/53 |
| 2010/0161235 A1 * | 6/2010 | Ikelle | G01V 1/364 702/17 |
| 2010/0246324 A1 | 9/2010 | Dragoset, Jr. | |

FOREIGN PATENT DOCUMENTS

| | | | |
|---|---|---|---|
| WO | WO 2006/037815 | 4/2006 | |
| WO | WO 2008/042081 | 4/2008 | |
| WO | WO 2008/076191 | 6/2008 | |
| WO | WO 2009/089418 | 7/2009 | |
| WO | WO 2009089418 A2 * | 7/2009 | G01V 1/364 |

OTHER PUBLICATIONS

Amundsen, L. (2001), "Elimination of free-surface related multiples without need of the source wavelet," *Geophysics* 66(1), pp. 327-341.

Ben-Hadj-Ali, H. et al. (2011), "An efficient frequency-domain full waveform inversion method using simultaneous encoded sources," *Geophysics* 76(4), pp. R109-R124.

Berkhout, A.J. et al. (2008), "From simultaneous shooting to blended acquisition," SEG Las Vegas 2008 Annual Meeting, pp. 2831-2838.

Berkhout, A.J. (1982), "Seismic migration, imaging of acoustic energy by wave field extrapolation; Wave field extrapolation: the forward problem," Chapter 6, Elsevier, pp. 151-169.

Ikelle, L.T. (1999), "Combining two seismic experiments to attenuate free-surface multiples in OBC data," *Geophysical Prospecting* 47, pp. 179-193.

Krebs, J.R. et al. (2009), "Fast full-wavefield seismic inversion using encoded sources," *Geophysics* 74(6), pp. WCC177-WCC188.

Lin, T.Y. et al. (2010), "Stabilized estimation of primaries by sparse inversion," *EAGE Technical Program Expanded Abstracts*, 48 pgs.

van Groenestijn, G.J.A. et al. (2009), "Estimation of primaries by sparse inversion applied to up/down wavefields," SEG Houston 2009 Int'l. Exposition & Annual Meeting, pp. 3143-3147.

van Groenestijn, G.J.A. et al. (2009), "Estimating primaries by sparse inversion and application to near-offset data reconstruction," *Geophysics* 74(3), pp. A23-A28.

van Groenestijn, G.J.A. et al. (2010), "Estimation of primaries by sparse inversion from passive seismic data," *Geophysics* 75(4), pp. SA61-SA69.

van Groenestijn, G.J.A. et al. (2011), "Using surface multiples to estimate primaries by sparse inversion from blended data," *Geophysical Prospecting* 59, pp. 10-23.

Verschuur, D.J. et al. (1997), "Estimation of multiple scattering by iterative inversion, Part II: Practical aspects and examples," *Geophysics* 62(5), pp. 1596-1611.

Verschuur, D.J. et al. (1999), "Integration of Obs data and surface data for OBS multiple removal," *SEG Expanded Abstracts*, 4 pgs.

*International Search Report and Written Opinion*, dated Feb. 25, 2012, PCT/US2011/056163.

\* cited by examiner

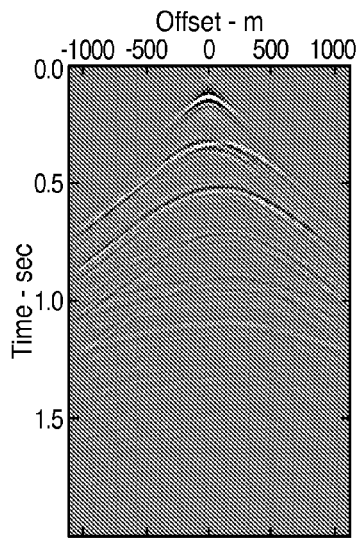
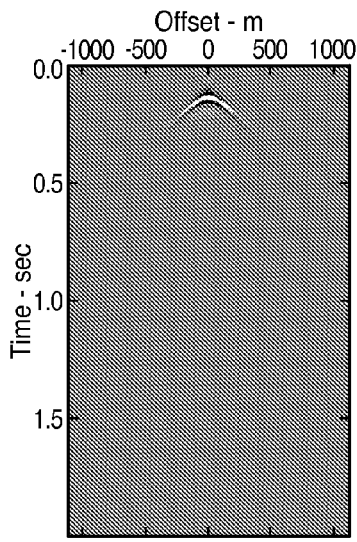
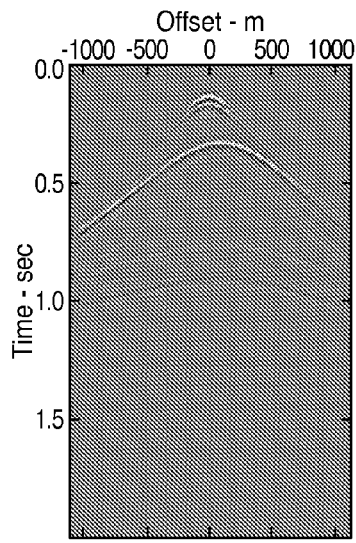
FIG. 4A          FIG. 4B          FIG. 4C
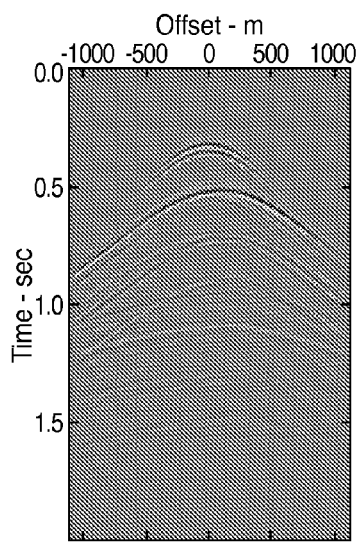
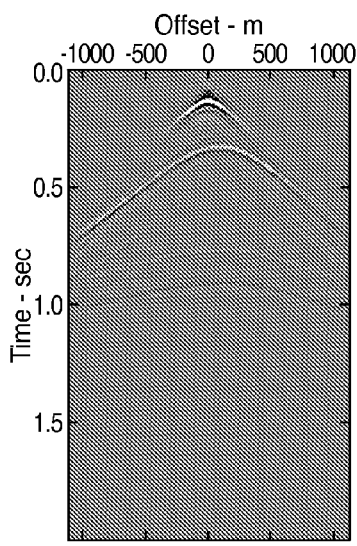
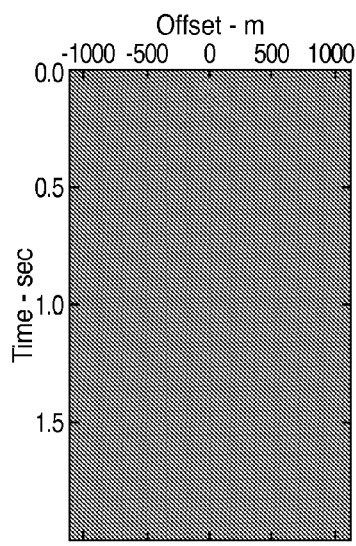
FIG. 4D          FIG. 4E          FIG. 4F

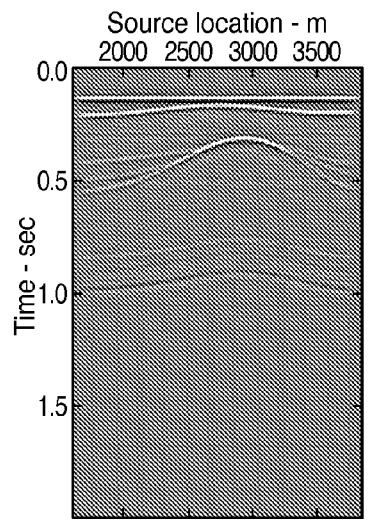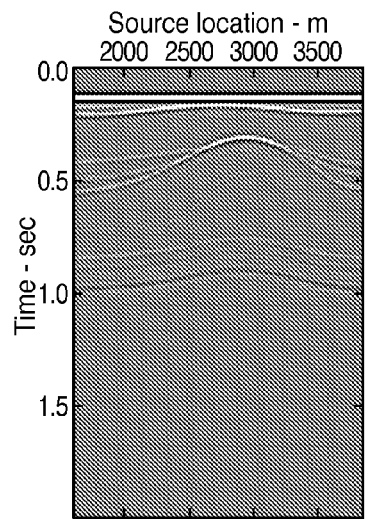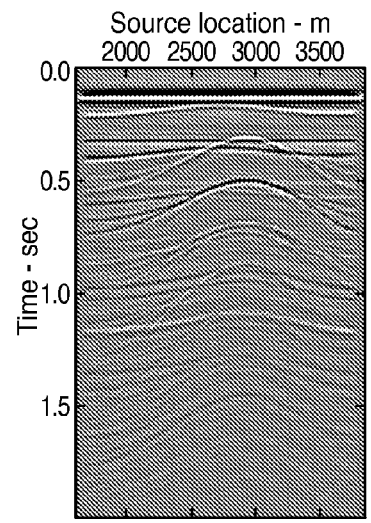
FIG. 5A  FIG. 5B  FIG. 5C
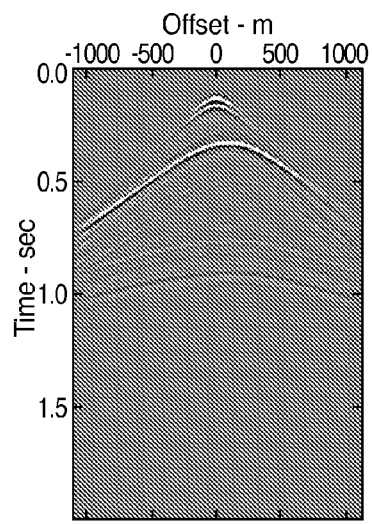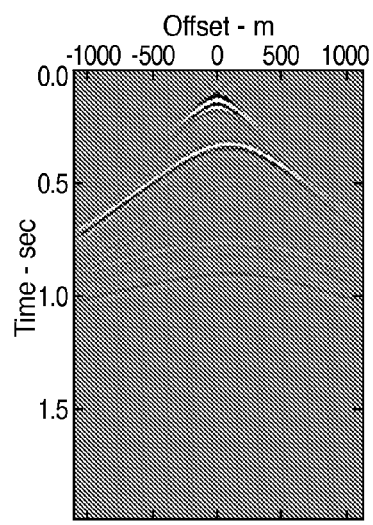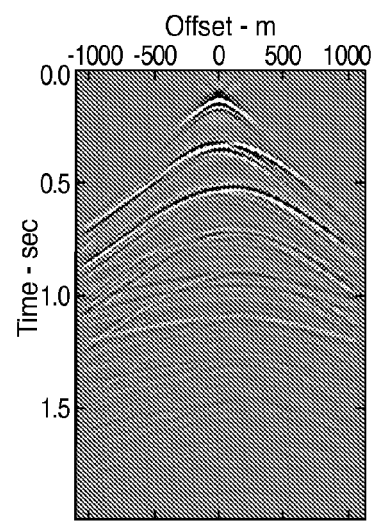
FIG. 5D  FIG. 5E  FIG. 5F

$$\begin{pmatrix} S_{11}, & 0, & 0, & 0 \\ 0, & S_{22}, & 0, & 0 \\ 0, & 0, & S_{33}, & 0 \\ 0, & 0, & 0, & S_{44} \end{pmatrix} \begin{pmatrix} 1, & 0 \\ 0, & 1 \\ e^{-j\omega \Delta t_1}, & 0 \\ 0, & e^{-j\omega \Delta t_2} \end{pmatrix} = \begin{pmatrix} S_{11}, & 0 \\ 0, & S_{22} \\ e^{-j\omega \Delta t_1} S_{33}, & 0 \\ 0, & e^{-j\omega \Delta t_2} S_{44} \end{pmatrix}$$

$\underbrace{\phantom{XXXXX}}_{S} \quad \underbrace{\phantom{XX}}_{r} \quad \underbrace{\phantom{XXXXX}}_{S_{bl}}$ $$\begin{pmatrix} P_{11}, & P_{21}, & P_{31}, & P_{41} \\ P_{12}, & P_{22}, & P_{32}, & P_{42} \\ P_{13}, & P_{23}, & P_{33}, & P_{43} \\ P_{14}, & P_{24}, & P_{34}, & P_{44} \end{pmatrix} \begin{pmatrix} 1, & 0 \\ 0, & 1 \\ e^{-j\omega \Delta t_1}, & 0 \\ 0, & e^{-j\omega \Delta t_2} \end{pmatrix} = \begin{pmatrix} P_{11} + e^{-j\omega \Delta t_1} P_{31}, & P_{21} + e^{-j\omega \Delta t_1} P_{41} \\ P_{12} + e^{-j\omega \Delta t_1} P_{32}, & P_{22} + e^{-j\omega \Delta t_1} P_{42} \\ P_{13} + e^{-j\omega \Delta t_1} P_{33}, & P_{23} + e^{-j\omega \Delta t_1} P_{43} \\ P_{14} + e^{-j\omega \Delta t_1} P_{34}, & P_{24} + e^{-j\omega \Delta t_1} P_{44} \end{pmatrix}$$

$\underbrace{\phantom{XXXXX}}_{P} \quad \underbrace{\phantom{XX}}_{r} \quad \underbrace{\phantom{XXXXX}}_{P_{bl}}$

*FIG. 11*

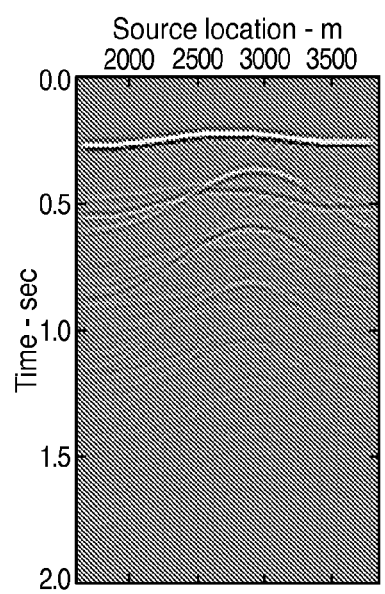 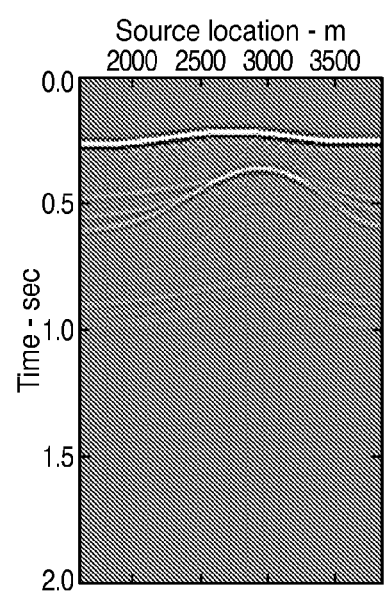 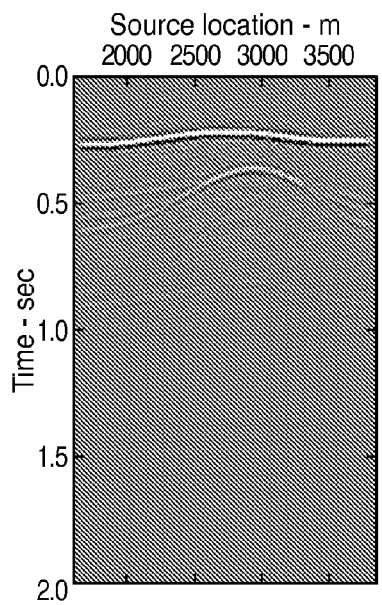
*FIG. 13A*  *FIG. 13B*  *FIG. 13C*

PRIMARY ESTIMATION ON OBC DATA AND DEEP TOW STREAMER DATA

CROSS-REFERENCE TO RELATED APPLICATION

This application is the National Stage entry under 35 U.S.C. 371 of PCT/US2011/056163 that published as WO 2010/074612 and was filed on 13 Oct. 2011, which claims the benefit of U.S. Provisional Applications No. 61/418,690, filed on 1 Dec. 2010 and No. 61/526,541, filed 23 Aug. 2011, which are incorporated herein by reference, in their entirety, for all purposes.

FIELD OF THE INVENTION

The invention relates generally to the field of geophysical prospecting and. More particularly the invention relates to processing of ocean-bottom-cable seismic data and deep tow streamer data. Specifically, the invention is a method for estimating primary reflection signals by inverting the data.

BACKGROUND OF THE INVENTION

In order to properly image ocean bottom cable ("OBC") data or deep tow streamer data, the surface-related multiple reflections need to be removed first. The desired information is contained in the direct reflections, and the surface-related multiple reflections, or simply "multiples," constitute noise that tends to obscure the direct reflections, called primary reflections, or simply "primaries." Several methods have been proposed to do this.

These include methods based on a difference in spatial behavior of primaries and multiples, like Radon transforms. These methods rely on the assumption that the subsurface has an increasing velocity profile with depth. If this is not the case the methods will fail.

Another type of known method, predictive deconvolution, will remove only the surface-related multiples associated with the water bottom.

Multiple prediction and subtraction methods, such as the surface-related multiple elimination "(SRME)" method of Verschuur and Berkhout (1997), which paper is incorporated herein in all jurisdictions that allow it, and multidimensional up/down division methods, like Amundsen inversion (Amundsen, 1999), have the advantage that they (a) do not make an assumption on the subsurface velocity profile below the water bottom; and (b) remove all surface-related multiples. However, applying them to OBC data is difficult requiring additional data and/or wavefield separation. For example, Verschuur and Neumann (1999) and Ikelle (1999) proposed that SRME could be applied to OBC data but an additional recording of streamer data over the ocean bottom cable would be required. For application to OBC data and deep tow streamer data, Amundsen's method requires that the measured pressure wavefield is separated in an upgoing and downgoing wave field. This separation is not straightforward. Moreover, both of these methods rely on a complete coverage of the water bottom or the deep tow depth with receivers. For shallow water OBC data this is not possible because the source signal will saturate the near-offset receivers and no interpolation algorithm exists to interpolate them with enough accuracy. For the Amundsen inversion the far offsets are also important to prevent artifacts in the end result.

Recently the estimation of primaries by a sparse inversion ("EPSI") method was introduced by van Groenestijn and Verschuur (this 2009 *Geophysics* paper is incorporated herein by reference in all jurisdictions that allow it). This is a large scale inversion method that makes use of the same forward model as SRME. Like SRME, this method makes no assumption about the subsurface velocity profile below the water bottom. However, thus far the method has been applied to surface recorded (streamer) data only. The difficulty with applying it to OBC data and deep tow streamer data is that the datum for the recorded wavefields is the ocean bottom respectively deep tow depth whereas the surface-related multiples reflect off of the air-water interface. Thus it is not obvious how to relate the recorded data to the multiples one wishes to estimate and subtract from the data, without additional data (as Verschuur and Neumann (1999) and Ikelle (1999) proposed).

Other published methods for correcting OBC data for multiple reflections are briefly summarized next.

In U.S. Pat. No. 6,678,207 to Duren ("Multiple Suppression for Ocean Bottom Seismic Data"), a method is disclosed that uses a decomposition of the pressure and velocity data into an up- and downgoing wavefield.

In U.S. Pat. No. 6,654,693 to Sen ("Angle dependent surface multiple attenuation for two-component marine bottom sensor data"), a method is disclosed that uses a decomposition of the pressure and velocity data into an up- and downgoing wavefield.

In U.S. Pat. No. 6,101,448 to Ikelle, et al. ("Multiple attenuation of multi-component sea-bottom data"), a method is disclosed that uses two components (pressure and velocity) instead of only one component (pressure) to obtain the primaries.

In U.S. Patent Application Publication No. 20100246324 ("Multiple Attenuation for Ocean-Bottom Seismic Data"), by Dragoset et al., a method is disclosed that needs to decompose the wavefield into an up- and down-going wavefield. This is also a prediction and subtraction method instead of an inversion method.

In PCT International Patent Application Publication No. WO2008076191 ("Identification and Suppression of Multiples in Ocean Bottom Seismic Data"), by Stewart, a method is disclosed that uses two components (pressure and velocity) instead of only one component (pressure) to obtain the primaries.

In PCT International Patent Application Publication No. WO2010/0161235 A1 ("Imaging of multishot seismic data"), by Ikelle, methods are disclosed that either use two components (pressure and velocity) instead of only one component (pressure) to obtain the primaries, or work as a prediction subtraction method instead of an inversion method.

SUMMARY OF THE INVENTION

The present inventive method comprises a modification of the EPSI method for the primary estimation on OBC data and deep tow streamer data. This new method solves the problems that the EPSI method has when applied to OBC data and deep tow streamer data by formulating a new model relating data to primaries, specifically suited for OBC data and deep tow streamer data. The present inventive method:

Does not need to separate the pressure wavefield in an upgoing and a downgoing wavefield (although, when this separation is available it can be used);

Is able to reconstruct the missing near offset data, simultaneous with estimating primaries;

Does not make an assumption about the subsurface velocity profile below the water bottom, although it may assume that the velocity in the water column is known.

Removes all surface-related multiples (not just those associated with the water bottom).

The present inventive method will work for every water depth, i.e. in any marine (offshore) environment. For conventional streamer data, it might be overkill. The method is most advantageous for cases where it is difficult to remove the receiver ghost and the direct wave, both of which are requirements for multiples removal algorithms like SRME and "conventional" EPSI. In OBC data, the removal of the direct wave is difficult due to the fact that it arrives on the same time as the water-bottom primary. The removal of the receiver ghost is also not straightforward. Besides OBC seismic surveys, marine surveys employing deep-towed receiver streamers will also benefit from the present inventive method. A typical deep-towed streamer may be 40 m or more below the surface of the water.

The present inventive method also includes a method to improve the computational efficiency of inversion methods to estimate primary reflections. The method consists of combining sources and receivers in such a way as to reduce the size of the underlying matrices in the computation. This technique will work not only on the present inventive method, but also on any method for estimating primary reflections by data inversion.

In one embodiment, described here with reference numbers referring to the flowchart of FIG. 7, the present invention is a method for correcting measured data from a marine seismic survey to eliminate surface-related multiples. The measured data are pressure data either measured by pressure sensor receivers located in the water or calculated from measured particle velocity data. The method comprises the following steps in this example embodiment of the invention:

(a) using a computer to simulate the measured data ("simulated data") with a forward model (72) that includes a water propagation operator between source locations and receiver locations and a term representing primary impulse responses;

(b) performing data inversion, i.e. updating the primary impulse responses by iterative optimization (74) to minimize a difference between the measured data and the simulated data (73); and (c) using the updated primary impulse responses to correct the measured data for multiple reflections (75), or for further processing to interpret for indications of hydrocarbon potential.

Preferably the measured data are first conditioned (71) in order to improve the stability of the inversion. Optionally, the measured data may be blended using source and/or receiver encoding during the forward simulation (72), to save computational costs in the forward simulation (72) and in the inversion (73).

It will be apparent to all persons who work in the technical field that practical applications of the invention must be performed using a computer programmed according to the teachings herein, i.e. the invention is computer implemented.

BRIEF DESCRIPTION OF THE DRAWINGS

The present invention and its advantages will be better understood by referring to the following detailed description and the attached drawings in which:

FIGS. 4A-F show the following results for the example: (A) a shot gather simulated using the velocity model, and the following quantities estimated using the present invented method: (B) the estimated direct wave, (C) the estimated primaries, (D) the estimated multiples, (E) the estimated conservative primaries=data−multiples, (F) the unexplained data or residual;

FIGS. 5A-F show more results for the example: (A) zero offset of the estimated direct primaries, $X_0 S$, (B) true primaries plus direct wave, (C) total data, (D) shot gather of estimated direct primaries, (E) true primaries plus direct wave with filtered high angles, (F) total data;

FIG. 11 shows an example of a blending operator, $\Gamma$, and its effect on a source matrix, S, and data matrix, P;

FIGS. 13A-13C show results of the method: (A) A zero offset gather (i.e., the zero-offset receiver data is displayed for different source locations) of the data. (B) Zero offset gather of the true primaries. (C) Zero offset gather of the estimated primaries, $X_0 S$.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
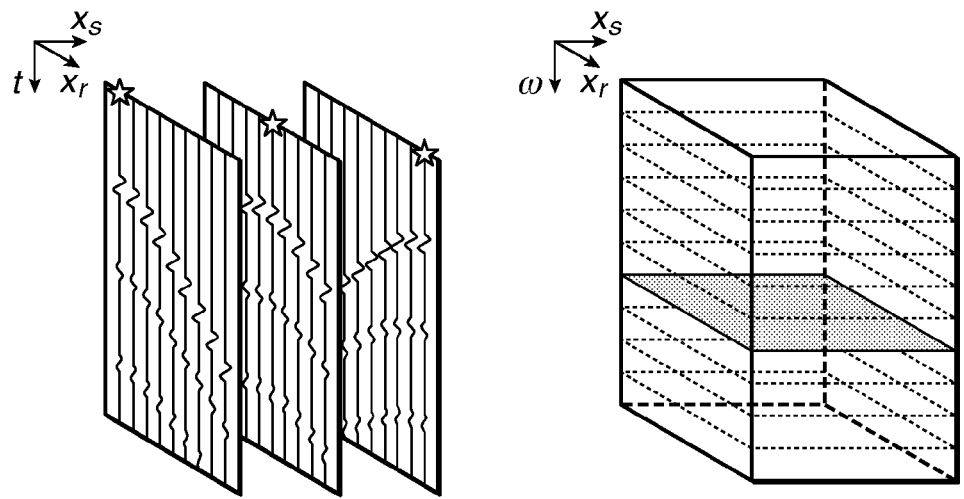
FIG. 1 is a schematic diagram illustrating how measured pressure data are stored in a cube $p(t, x_r, x_s)$, which is transformed to the frequency domain; a frequency slice of this cube is the data matrix, P.

By making use of the detail hiding operator notation (Berkhout, 1982, which paper is incorporated herein by reference in all jurisdictions that allow it, the total pressure wavefield measured at the ocean bottom receivers may be described in terms of direct arrivals, primaries and multiples. (Direct arrivals are also noise tending to obscure the desired primaries. They are acoustic waves that travel from the source directly to the receiver without ever reflecting off of any interface.) The detail hiding operator notation makes use of frequency matrices. These matrices are obtained by ordering the measured pressure data in a cube $p(t, x_r, x_s)$ where $x_r$ is the receiver position and $x_s$ the source position (see FIG. 1) and transforming this cube to the frequency domain. A frequency slice of this cube is what will be referred to herein as the data matrix, P. Note that, in this matrix one column represents a monochromatic shot gather and one row a monochromatic receiver gather. Further on in this disclosure, properties in addition to the pressure data will also be described with matrices.

Figure 2:
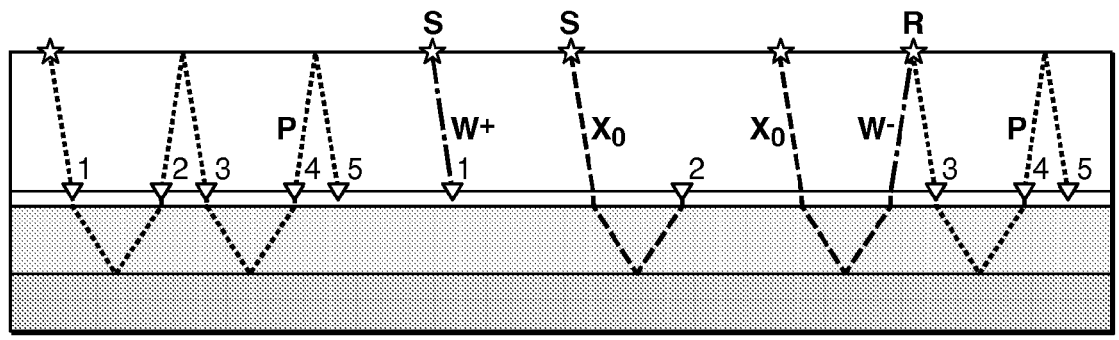
FIG. 2 is a diagram showing a raypath of the measured data at the receivers (numbered 1 to 5) and the components with which the raypath is built.

On the left side in FIG. 2 a raypath is shown that represents an event that might appear in measured pressure data. The data consist of the following components:

The direct arrival, $W^+(z_1,z_0)$ $S(z_0)$, is obtained from a matrix multiplication of the water propagation operator $W^+(z_1,z_0)$—see Berkhout (1982)—and a source matrix $S(z_0)$. The water propagation operator $W^+(z_1,z_0)$ describes the propagation of wavefields from depth level $z_0$ (being the surface) through the water to depth level $z_1$ (being slightly above the water bottom). It is assumed that the water velocity is known and therefore $W^+$ is known. In this initial description of the EPSI algorithm, it is assumed that the source wavelet is constant for all shots. Therefore, the source matrix $S(z_0)$ can be replaced with a scalar $S(z_0)$. However, it should be clear to someone skilled in the technical field that this simplification for illustration could be easily overcome merely by using the full source matrix $S(z_0)$ instead of the scalar $S(z_0)$. The raypath of a direct arrival is depicted in FIG. 2 as the event that arrives at receiver number 1.

The primaries, $X_0(z_1,z_0)$ $S(z_0)$, are obtained from a matrix multiplication of the primary impulse responses (Green's functions), $X_0(z_1,z_0)$, with the source matrix. The primary impulse responses $X_0(z_1,z_0)$ describe the propagation of wavefields from the surface, after (multiple) reflection(s) below depth level $z_1$, back upward to depth level $z_1$. The raypath of a primary is depicted in FIG. 2 as the event that arrives at receiver number 2.

In the case that the source wavelet does not change during seismic acquisition, the multiples can be described by; $P(z_1,z_0)$ $R(z_0,z_0)$ $W^-(z_0,z_1)$ $X_0(z_1,z_0)$. Here, $R(z_0,z_0)$ represents the surface reflector matrix, and equals $-I$ for complete reflection from the air-water interface. Note that the water propagation operator $W^-$ is now propagating the wavefield from the water bottom to the surface (rather than the source wavelet to the water bottom to represent the direct wave as just described above) and that $W^-$ is the transposed matrix of $W^+$. The raypath of a multiple is depicted in FIG. 2 as the events that arrive at receiver numbers 3, 4, and 5. In case the source wavelet does change, the multiples are given by $P(z_1,z_0)$ $S^{-1}(z_0)$ $R(z_0,z_0)$ $W^-(z_0,z_1)$ $X_0(z_1,z_0)$ $S(z_0)$. The multiples illustrated in FIG. 2 are called surface-related multiples because they reflect at least once off the air-water surface. Another type of multiple reflection reflects between subsurface interfaces. Contribution from these so-called internal multiples typically may be considered negligible and is not considered in the formulation that follows.

The components just described allow one to write the complete forward model of OBC data as:

$$P=W^+S+X_0S+PRW^-X_0. \quad (1)$$

Figure 7:
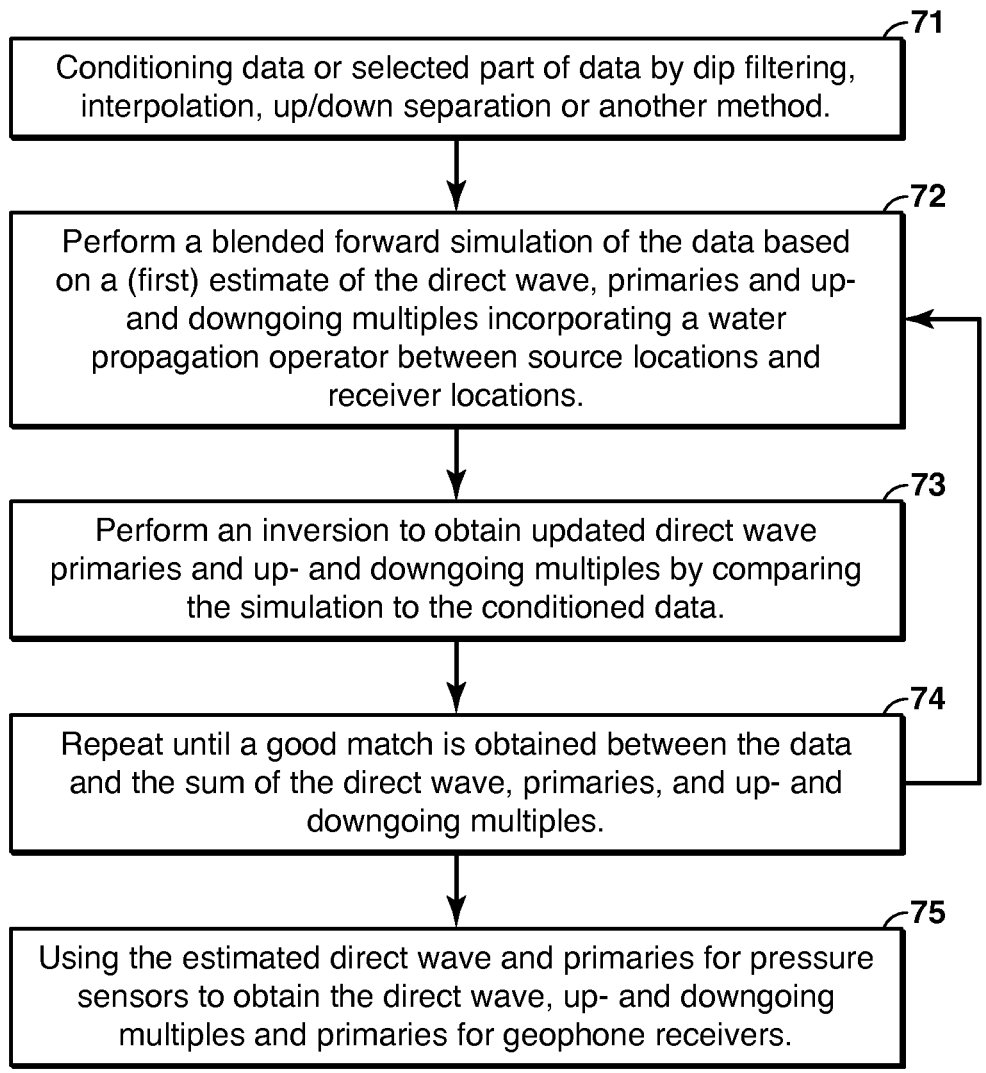
FIG. 7 is a flow chart showing basic steps in one embodiment of the present invention method.

Note that the depth levels are omitted in Equation 1. A main idea of the present inventive method is to estimate $X_0$ and $S$ by optimization, such that Equation 1 is satisfied. Therefore, the objective function J is introduced as:

$$J_i=\Sigma_\omega\Sigma_{j,k}|P-W^+S_i-X_{0,i}S_i-PRW^-X_{0,i}|_{j,k}^2, \quad (2)$$

where i denotes the iteration number, $\Sigma_{j,k}$ indicates a summation over all the squared elements of the matrix (i.e. a summation over all sources and receivers), and $\Sigma_\omega$ indicates a summation over all the frequencies. Note that the objective function will go to zero if the correct $X_{0,i}$ and $S_i$ are found. The objective function is minimized iteratively in a similar way as in the original EPSI method. Prior to the optimization the data optionally are conditioned to improve the stability of the inversion; see step 71 in the flowchart of FIG. 7.

In the case of missing near-offset data the total data are divided into two subsets, $P_i=P'_i+P''$, where P'' is the part of the data that does not need to be reconstructed and $P'_i$ is the missing near-offset part that has to be reconstructed. The new objective function becomes:

$$J_i=\Sigma_\omega\Sigma_{j,k}|P_i-W^+S_i-X_{0,i}-S_i-P_iRW^-X_{0,i}|_{j,k}^2. \quad (3)$$

This may be solved in a similar way as the original EPSI method does with missing near offset data. Note that the missing near-offset part of $P_i$ may become a third quantity that is determined in the optimization process in this embodiment of the invention.

In the case that a separation of the total data into a downgoing, $P^+$, and upgoing, $P^-$, wavefield is available (this can be determined from co-located geophones), the forward model can be written as:

$$P^+=W^+S+P^+RW^-X_0, \quad (4)$$

and $$P^-=X_0S+P^-RW^-X_0. \quad (5)$$

The objective function to be solved will become:

$$J_i=\Sigma_\omega(\beta\Sigma_{j,k}|P_i^+-W^+S_i-P_i^+RW^-X_{0,i}|_{j,k}^2+(1-\beta)\Sigma_{j,k}|P_i^--X_{0,i}S_i-P_i^-RW^-X_{0,i}|_{j,k}^2), \quad (6)$$

where $\beta$ can be chosen between 0 and 1. This may be solved in a similar way as the other objective functions, resulting in data that are reconstructed where needed and corrected for multiple reflections at all offsets.

In case particle velocity data is also measured, as can be done by motion detectors such as geophones, the $X_0$ obtained from pressure data can be used to estimate the surface-related multiples in the vertical particle velocity data ($V_z$), as $V_zRW^-X_0$, and its primaries as $V_z-V_zRW^-X_0$ in the same way the surface-related multiples can be estimated from the horizontal particle velocity data, $V_xRW^-X_0$ and $V_yRW^-X_0$. and their primaries as $V_x-V_xRW^-X_0$ and $V_y-V_yRW^-X_0$.

Multi Dimensional Application

The examples given herein are based on 2D (depth and x-direction) data. However, applying the invention to 3D (depth, x and y-direction) data is a straightforward extension of the 2D application.

EXAMPLE

Figure 3:
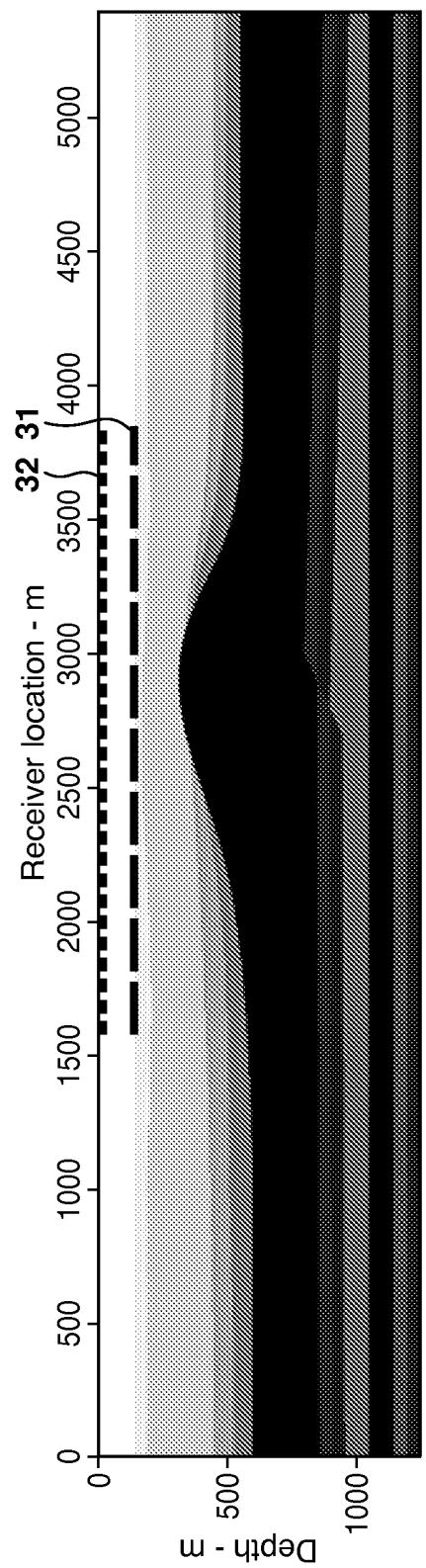
FIG. 3 shows the velocity profile of a synthetic subsurface model used in the example.

An OBC acquisition was simulated with the aid of the subsurface model shown in FIG. 3. The model contains a high velocity salt layer. The water bottom is at 140 meters depth. The dotted line at the water bottom 31 indicates the location of the receivers. The dotted line at the surface 32 indicates the location of the sources. 150 OBC nodes are located between receiver location x=1575 m and x=3810 m at a depth of 140 m. 150 shots are fired exactly above the receivers.

A shot gather from the obtained dataset is shown in FIG. 4A. It can be seen in FIG. 4A, as well as in FIGS. 4B-F, that the wavefield coming from the source has been recorded by the receivers, directly (first arrival) or after (multiple) reflections at the reflectors in the subsurface, as parabolic-like curves. (To demonstrate the 2D capabilities of the invention, a data set was chosen from a non-horizontal layered subsurface.) These parabolic-like curves are a function of source-receiver spacing (called offset) in the horizontal direction, and travel time of the seismic wave in the vertical direction. It is the task of seismic processing to turn these measurements into an image of the subsurface. As can be clearly observed in FIG. 4A, the steep angles have been removed from the data in preprocessing. The modified EPSI algorithm, meaning the published EPSI algorithm modified to have $X_0$ and S estimated by optimization as described above using the objective function in Equation 2, was applied to the data to estimate $X_0$ and S. With the estimates for $X_0$ and S, the components of which the shot gather consists can be calculated: the estimated direct arrival, $W^+S$ (FIG. 4B), the estimated primaries, $X_0S$ (FIG. 4C), and the estimated multiples, $PRW^-X_0$ (FIG. 4D).

FIG. 4E shows a conservative primary estimation that is obtained by subtracting the estimated multiples from the total data; $P-PRW^-X_0$. Note that this is not an adaptive subtraction, and that the conservative primaries still contain the direct wave. FIG. 4F shows that the EPSI algorithm has explained most of the data, since the residual, $P-WS^+S-X_0S-PRW^-X_0$, is almost zero.

In FIGS. 5A-F, the quantities shown at zero offset (i.e., the zero-offset receiver data is displayed for different source locations) in FIGS. 5A-C correspond, respectively, to the quantities shown for all offsets (i.e., shot gathers) in FIGS. 5D-F. The zero-offset times of the direct estimated primaries shown in FIG. 5A compared to those of the true (i.e., synthetically simulated) primaries (plus direct wave) in FIG. 5B clearly point out an erroneous primary in the estimation; the water bottom multiple has leaked into the primary estimation at about 0.3 s and 0.5 s (seen as faint horizontal lines). This leakage may be expected to be a lot smaller in more complex (field) data. FIGS. 5D and 5E repeat the comparison, but now for a shot gather. Comparing the total data (FIGS. 5C and 5F) and the (estimated) primaries it becomes clear that the primaries are significantly overlapping with the direct wave and the multiples.

Reconstructing Missing Near Offsets

Figure 6A:
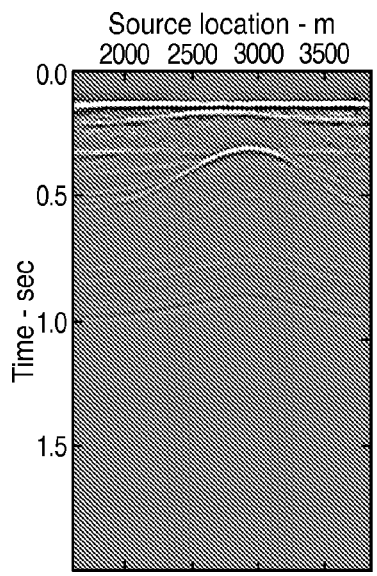
FIGS. 6A-F show more results for the example: (A) zero offset of the estimated direct primaries, $X_0 S$, (B) true primaries plus direct wave, (C) total data including the reconstructed part, (D) shot gather of estimated direct primaries, (E) true primaries plus direct wave with filtered high angles, and (F) total data including the reconstructed part.
Figure 6B:
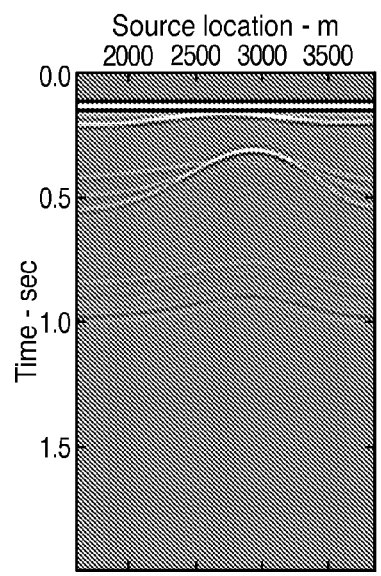
Figure 6C:
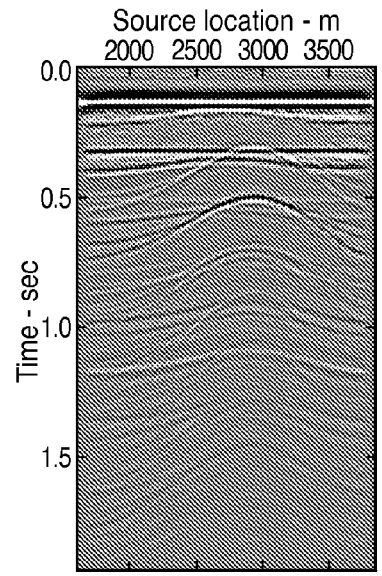
Figure 6D:
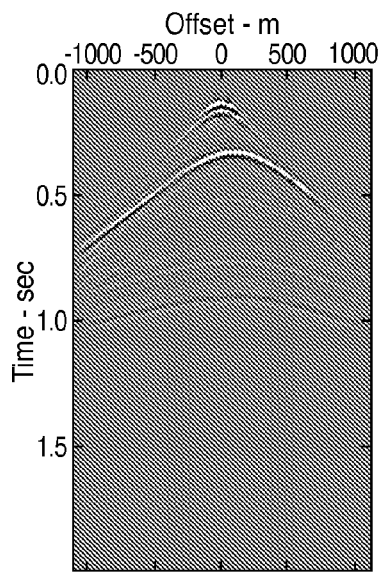
Figure 6E:
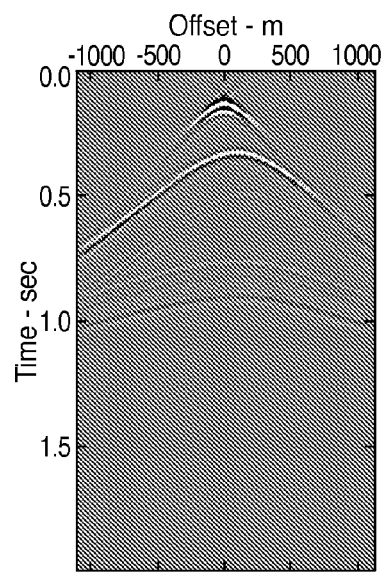
Figure 6F:
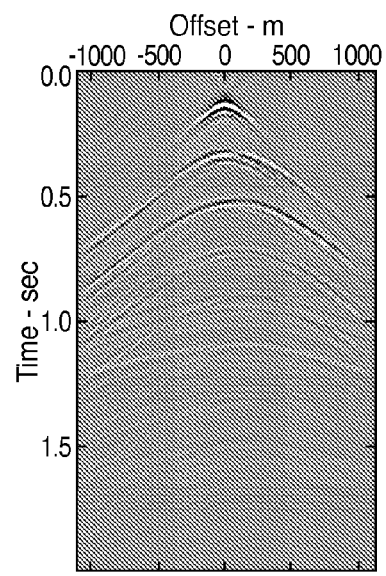

The same dataset as above is used, but now the first 0.4 seconds of data are removed from the receiver within a 105 meter offset range from the source. The idea behind only reconstructing the first 0.4 seconds is that the events in the near offsets after 0.4 seconds have a much more "flatish" curvature, such that they can be interpolated accurately enough with, for example, Radon interpolation. For this example we have not interpolated the near offsets below 0.4 seconds, but we have taken the simulated data. The missing data will be reconstructed by the EPSI-OBC algorithm, by which term is meant the present inventive method, i.e. the modification of the EPSI algorithm according to the present invention. As with FIGS. 5A-F, the quantities shown at zero offset in FIGS. 6A-C correspond, respectively, to the quantities shown for all offsets in FIGS. 6D-F. FIGS. 6C and F show the total data with the reconstructed part in, respectively, a zero offset section and a shot gather. The zero offset section in FIG. 6A shows a good primary estimation, apart from the multiple leakage of the water bottom (as discussed above), and some cross-correlation noise due to the data reconstruction in the first 0.4 seconds. Experience shows that the last type of noise is further diminished by increasing the number of receivers. FIG. 6D shows the estimated primaries in a shot gather.

A Speed-Up Technique for Primary Estimation

Krebs et al. (PCT Patent Application Publication No. WO 08/042081 (2008)) showed that iterative inversion of seismic data to infer a physical property model may be considerably sped up using source encoding, whereby many encoded shots are simultaneously inverted in a single inversion. Krebs also disclosed that convergence may typically be further sped up by changing the encoding from one iteration to the next. See also Krebs at al. (2009). Both Krebs et al. (2008) and Krebs et al. (2009) are incorporated herein in their entirety in all jurisdictions that allow it. Source encoding will also work when it is primary estimation that is to be inferred from the inversion (van Groenestijn and Verschuur, 2010b).

Besides the present inventive method, several authors have published methods that do primary estimation through an inversion for different types of data; e.g. surface streamer data (Amundsen (2001), van Groenestijn and Verschuur (2009a), and Linn and Herrmann (2010)), ocean bottom cable data (Amundsen, 1999), multi-component data (van Groenestijn and Verschuur, 2009b), simultaneous source acquisition data (van Groenestijn and Verschuur, 2010a) and passive data (van Groenestijn and Verschuur, 2010b).

Compared to other data driven primary estimation methods, inversion methods have big advantages, resulting in better primary estimations. They avoid an adaptive subtraction of the predicted multiples, and the estimation of primaries by sparse inversion (EPSI) method can reconstruct missing data. The big disadvantage of the primary estimation methods is that it is computationally expensive. The following described method to speed up the primary estimation methods by inversion through source and or receiver encoding addresses this shortcoming. This speed-up technique is not limited to OBC or deep-tow streamer data, but will also work on different types of data.

The speed-up technique will be explained in the context of one primary estimation method, the EPSI method (which includes the improved version disclosed herein), and for one type of data, split spread marine data, which is different from OBC or deep tow streamer data. However, it will be clear to anyone skilled in the technical field that it can be easily applied to other types of data (including OBC and deep tow streamer data) and also to other primary estimation algorithms. Similarly, the example given herein removes only the surface-related multiples from the data; however, it will again be clear to someone skilled in the technical field that the method can be easily applied to primary estimation methods that (also) remove internal multiples. The example given herein is based on 2D (depth and x-direction) data. However, applying the invention to 3D (depth, x and y-direction) data is a straightforward extension of the 2D application.

Figure 8:
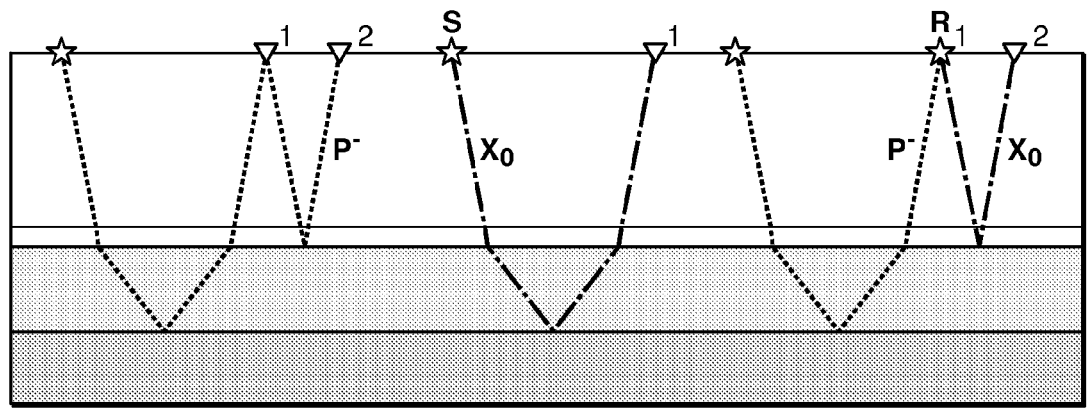
FIG. 8 shows a ray-path on the left that consists of a primary ray-path arriving in receiver 81, and a ray-path of a multiple arriving in receiver 82 consisting of a primary ray-path and a data raypath.

We will first introduce the forward model of split-spread marine data. On the left side in FIG. 8, a ray-path is shown that represents an event that might appear in the measured upgoing pressure wavefield, $P^-$, at the surface. The upgoing pressure wavefield consist of the following components:

The primaries, $X_0S$, are obtained from a matrix multiplication of the primary impulse responses (Green's functions), $X_0$, with the source matrix. The primary impulse responses $X_0$ describe the propagation of wavefields from the surface into the subsurface and after (multiple) reflection(s) in the subsurface, back upward to the surface. The ray-path of a primary is depicted in FIG. 8 as the event that arrives at receiver number 81.

The multiples are described by $X_0RP^-$. Here, R represents the surface reflector matrix, and equals –I for complete reflection from the air-water interface. The raypath of a multiple is depicted in FIG. 8 as the event that arrives at receiver number 82.

The components just described allow the complete forward model to be written as:

$$P^- = X_0 S + X_0 R P^-. \tag{7}$$

The main idea of the EPSI method is to estimate $X_0$ and $S$ by optimization, such that Equation 7 is satisfied. Therefore, EPSI uses the objective function J:

$$J_i = \Sigma_\omega \Sigma_{j,k} |P^- - X_{0,i} S_i - X_{0,i} R P^-|_{j,k}^2, \tag{8}$$

where i denotes the iteration number, $E_{j,k}$ indicates a summation over all the squared elements of the matrix (i.e. a summation over all sources and receivers), and $\Sigma_\omega$ indicates a summation over all the frequencies. Note that the objective function will go to zero if the correct $X_{0,i}$ and $S_i$ are found. In the EPSI method the objective function is minimized iteratively. Prior to the optimization the data optionally are conditioned to improve the stability of the inversion as in step 71 of the flowchart of FIG. 7.

Assuming that S=SI, then the two steps that are the most computationally intensive in the EPSI method are the calculations of the update step direction of the primary impulse responses and its scaling. The update step direction of the primary impulse responses, $\Delta X_0$, is given by:

$$\Delta X_0 = V(S_i + RP^-)^H, \tag{9}$$

with $V = (P^- - X_{0,i} S_i - X_{0,i} RP^-)$ as the unexplained data or residual. In order to scale the update step $\Delta V$, is calculated:

$$\Delta V = \Delta X_0 (S_i + RP^-). \tag{10}$$

This calculation is the second most computationally intensive step. For completeness, it may be mentioned that the scale factor, $\alpha$, now follows from:

$$\alpha = \Sigma_\omega \Sigma_{j,k} |V_{j,k} \Delta V_{j,k}| / \Sigma_\omega \Sigma_{j,k} |\Delta V_{j,k} \Delta V_{j,k}|, \tag{11}$$

and that:

$$X_{0,i+1} = X_{0,i} + \alpha \Delta X_0. \tag{12}$$

Both steps (equations 11 and 12) are not the ones that are the most computationally intensive.

If the data consist of N sources and N receivers, then the cost of these two matrix multiplications is $2N^3$. These matrix multiplications have to be done for a number of frequency slices $N_f$. The EPSI method will perform a number of iterations, $N_i$ (typical 60-100), bringing the total costs to $2N^3 N_f N_i$.

That this cost is considerable can be understood when the cost of EPSI is compared with the cost of running SRME (a surface-related multiple elimination method based on prediction and subtraction of multiples, see e.g. Verschuur and Berkhout (1997)). The main cost of SRME is (assuming only one iteration): $N^3 N_f$, which will be a factor 120 to 200 cheaper.

The present speed-up technique will bring the computational cost of primary estimation methods by inversion down to levels much more comparable to SRME.

Blended Data

If we reorder equation 7 into:

$$P^- = X_0(S + RP^-), \tag{13}$$

we no longer look at the data in terms of a primary part, $X_0 S$, and a multiple part, $X_0 RP^-$, but we can recognize an upgoing part, $P^-$, a downgoing part, $(S + RP^-)$, and a primary impulse response, $X_0$, that connects the two. This is depicted on the left side of FIG. 9.

Figure 9:
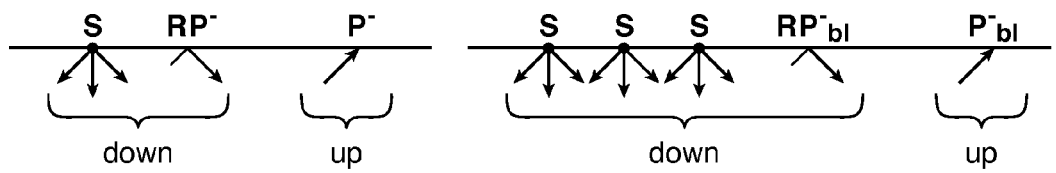
FIG. 9 shows that a downgoing wavefield can be generated by one source (left side) or more than one source (right side)
Figure 10:
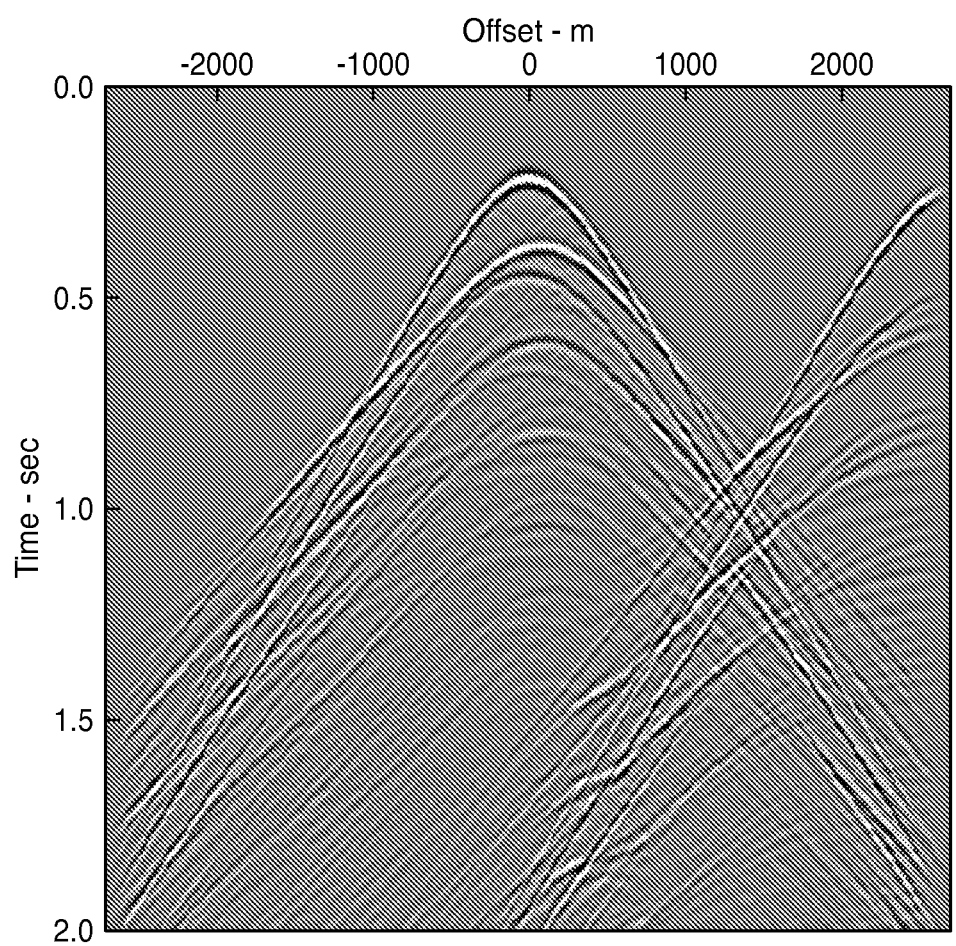
FIG. 10 shows an example of a recording of a blended source experiment, i.e. a shot gather from an experiment with two simultaneously operating, encoded sources.

Clearly, there should be a source present to generate the downgoing wavefield, but the downgoing wavefield can also be generated by two or more sources. The right side of FIG. 9 illustrates this. Shooting with two or more source arrays during one experiment is done in blended acquisition. FIG. 10 shows a blended, i.e. source encoded, shot gather that one might obtain from a blended experiment with two sources, i.e. a survey where the control signals for the two sources are separately encoded. We can reformulate the forward model for blended acquisition. In Berkhout et al. (2008) it is explained that the same forward model (equation 1) can be used for the case of blended acquisition, provided that a blended source matrix $S_{b1}$ is introduced:

$$P_{b1}^- = X_0(S_{b1} + RP_{b1}^-), \tag{14}$$

where the blended source matrix $S_{b1}$ carries the information of all the sources that are fired in each experiment. In Berkhout et al. (2008) the structure of this blended source matrix is further explained. There, a blending (source encoding) operator $\Gamma$ is introduced (see FIG. 11), that describes this blending process: $S_{b1} = S\Gamma$. If the blended experiment contains several sources that shoot with different time delays $\Delta t_i$, one column of blending operator $\Gamma$ consists of time shift operators $e^{-j\omega \Delta t_i}$ at the spatial locations of the sources that are involved in one blended experiment. Looking at FIG. 10, one can conclude that blending on the source side is the same as summing columns together, and, therefore, equation 14 is obtained by multiplying equation 7 on the left and right hand side with $\Gamma$, yielding:

$$P^- \Gamma = X_0 S \Gamma + X_0 RP^- \Gamma. \tag{15}$$

It is also possible to blend on the receiver side. In acquisition this would be equivalent to summing the signals arriving at two receiver positions into one measurement. Mathematically, both receiver and source blending at the same time can be expressed as:

$$\Gamma_r P^- \Gamma_s = \Gamma_r X_0 S \Gamma_s + \Gamma_r X_0 RP^- \Gamma_s, \tag{16}$$

where $\Gamma_r$ is the blending operator on the receiver side and $\Gamma_s$ is the blending operator on the source side. Blending on the receiver side is equivalent to summing rows on the matrix together.

Blending Data During Primary Estimation

Blending of data can be done physically during acquisition, as discussed above, but it can also be done in the processing stage, e.g. to data from a single source. In this example we will blend unblended synthetic data during the primary estimation to speed up the inversion. For the EPSI algorithm this means that the new objective function becomes:

$$J_i = \Sigma_\omega \Sigma_{j,k} |\Gamma_{r,i}(P^- - X_{0,i} S_i - X_{0,i} S_i - X_{0,i} RP^-) \Gamma_{s,i}|_{j,k}^2, \tag{17}$$

where the "i" in $\Gamma_{r,i}$ and $\Gamma_{r,i}$ mean that both blending operators are changed in each iteration. The blending operators can drastically cut down the costs of the two most computational expensive steps in EPSI:

The calculations of the update step direction of the primary impulse responses, $\Delta X_0$, becomes:

$$\Delta X_0 = \Gamma_{r,i}^H V((S_i + RP^-)\Gamma_{s,i})^H, \tag{18}$$

with $V = \Gamma_{r,i}(P^- - X_{0,i} S_i - X_{0,i} RP^-)\Gamma_{s,i}$, and the calculation of $\Delta V$ becomes:

$$\Delta V = \Gamma_{r,i} \Delta X_0 (S_i + RP^-) \Gamma_{s,i}. \tag{19}$$

Note that, even though the data are blended into smaller matrices, the size of $\Delta X_0$ is still the same as in equations 9 and 10. Let it be assumed that the size of the blending operator on the receiver side is n by N (with n<N) and the size of the blending operator on the source side is N by n. Both blending operators will contain N non-zeros, and will make sure that every element of the unblended data, P, is in the double blended data that has to be explained. In that case the costs of the blended matrix multiplications are basically determined by the following three steps:

$$V = (\Gamma_{r,i} P^- \Gamma_{s,i}) - (\Gamma_{r,i} X_{0,i})((S_i + RP^-)\Gamma_{s,i}). \quad (20a)$$

Costs: 4 blending operations: $4N^2$
1 summation: $N^2$
1 matrix multiplication: $n^2 N$ $$\Delta X_0 = \Gamma_{r,i}^H (V((S_i + RP^-)\Gamma_{s,i})^H), \quad (20b)$$

Costs: $(S_i + RP^-)\Gamma_{s,i}$ is already calculated in eq. 14a
1 blending operations: $N^2$,
1 matrix multiplication $n^2 N$ $$\Delta V = (\Gamma_{r,i} \Delta X_0)((S_i + RP^-)\Gamma_{s,i}). \quad (20c)$$

Costs: $(S_i + RP^-)\Gamma_{s,i}$ is already calculated in eq. 14a
1 blending operations: $N^2$,
1 matrix multiplication $n^2 N$ where the brackets are placed in the equations to indicate the order in which the multiplications should be carried out, and the calculation costs of each group in the equations are written below it. Summing the costs of the three major steps gives: $7N^2 + 3n^2 N$. In field data the dominant term will be $3n^2 N$. In case that the same amount of iterations are used this will speed up the EPSI method by a factor $(2N^2)/(3n^2)$. Note that this speed up is calculated on the number of mathematical operations only, which are not translatable one-to-one to the computation costs in a computer. Computer infrastructure might decrease or increase this factor.

EXAMPLE

A split-spread marine acquisition was simulated with the aid of the subsurface model shown in FIG. 3. The model contains a high velocity salt layer. The 150 shots and 150 receivers are located between x=1575 m and x=3810 m. Note that, for this example, both sources and receivers are located at the surface.

Figure 12A:
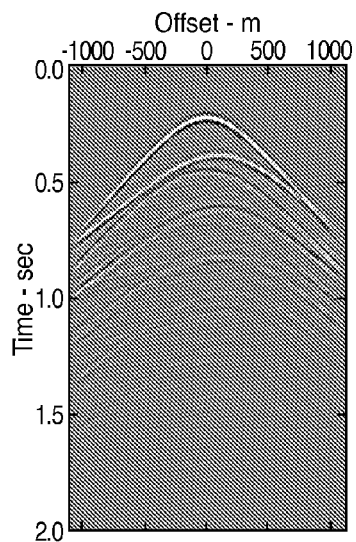
FIGS. 12A-12E show results of the method: (A) Shot gather of the input dataset. (B) True primaries. (C) Estimated primaries. (D) input data minus the estimated multiples. (E) estimated multiples.

A shot gather from the dataset is shown in FIG. 12A. It can be seen in FIG. 12A that the wavefield coming from the source has been recorded by the receivers after (multiple) reflections at the reflectors in the subsurface, as parabolic-like curves. These parabolic-like curves are a function of source-receiver spacing (called offset) in the horizontal direction, and travel time of the seismic wave in the vertical direction. It is the task of seismic processing to turn these measurements into an image of the subsurface.

Figure 12B:
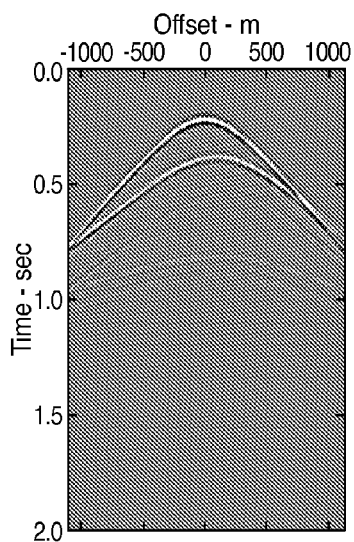
Figure 12C:
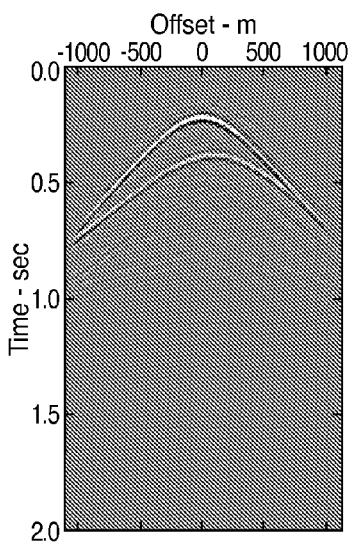
Figure 12D:
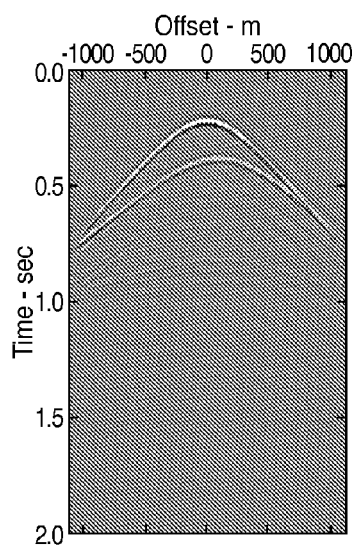
Figure 12E:
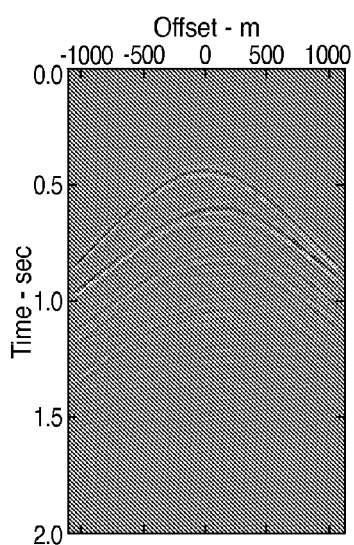

The EPSI algorithm, using the optimization as described above with the objective function in Equation 17, was applied to the data to estimate $X_0$ and S. In this example the sizes of the blending operators, i.e. the encoding operators, were; N=150 and n=30. With the estimates for $X_0$ and S, the components of which the shot gather consists can be calculated: the estimated primaries, $X_0 S$ (FIG. 12C), and the estimated multiples, $X_0 RP^-$ (FIG. 12E). FIG. 12D shows a conservative primary estimation that is obtained by subtracting the estimated multiples from the total data; $P^- - X_0 RP^-$. Note that this is not an adaptive, but a straight, subtraction. It is good to further note that the computational costs of calculating $X_0 RP^-$ are $N^2 N_f$. Both FIGS. 12C and 12D can be compared with the true primaries in FIG. 12B. There are small errors in both estimations, which might be considered the price one pays for the enormous computational speedup.

FIGS. 13A-13C show zero offset sections (i.e., the zero-offset receiver data are displayed for different source locations) for, respectively, the data, the true primaries, and the estimated primaries, $X_0 S$.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Amundsen, L., 1999, "Free-surface multiple attenuation of four-component (4C) sea floor recordings," *SEG Technical Program Expanded Abstracts* 18(1), 868-871.

Amundsen, L., 2001, "Elimination of free-surface related multiples without need of the source wavelet," *Geophysics* 66, 327-341.

Berkhout, A. J., 1982, Seismic migration, imaging of acoustic energy by wave field extrapolation, a: theoretical aspects: Elsevier.

Berkhout, A. J., Blacquière, G., and Verschuur, D. J., 2008, "From simultaneous shooting to blended acquisition," 78th Ann. Internat. Mtg., Soc. Expl. Geophys., *Expanded abstracts*, 2831-2838.

Ikelle, L. T., 1999, "Combining two seismic experiments to attenuate free-surface multiples in OBC data," *Geophysical Prospecting* 47(4), 179-193.

Krebs et al., (2008), "Direct inversion of data from simultaneous seismic sources," PCT Patent Application Publication No. WO 2008/042081.

Krebs, J. R., J. E. Anderson, D. H. Hinkley, A. Baumstein, S. Lee, R. Neelamani, M.-D. Lacasse, 2009, "Fast full wave seismic inversion using source encoding," *Geophysics* 74, WCC177-WCC188.

Lin, T. T., and Herrmann, F. J., 2010, "Stabalized estimation of primaries by sparse inversion," *EAGE Technical Program Expanded Abstracts*.

van Groenestijn, G. J. A., and Verschuur, D. J., 2009, "Estimating primaries by sparse inversion and application to near-offset data reconstruction," *Geophysics* 74(3), A23-A28.

van Groenestijn, G. J. A., and Verschuur, D. J., 2009, "Estimation of primaries by sparse inversion applied to up/down wavefields," *SEG Technical Program Expanded Abstracts* 28, 3143-3147.

van Groenestijn, G. J. A., and Verschuur, D. J., 2010, "Estimation of primaries by sparse inversion from passive seismic data," *Geophysics* 75(4), SA61-SA69.

van Groenestijn, G. J. A., and Verschuur, D. J., 2010, "Using surface multiples to estimate primaries by sparse inversion from blended data," *Geophysical Prospecting* 59, 10-23.

Verschuur, D. J. and Berkhout, A. J., 1997, "Estimation of multiple scattering by iterative inversion, part II: practical aspects and examples," *Geophysics* 62(5), 1596-1611.

Verschuur, D. J. and E. I. Neumann, 1999, "Integration of OBS data and surface data for OBS multiple removal," *SEG Expanded Abstracts* 18, 1350-1353.

Duren, (2004), "Multiple Suppression for Ocean Bottom Seismic Data," U.S. Pat. No. 6,678,207.

Sen, (2003), "Angle dependent surface multiple attenuation for two-component marine bottom sensor data," U.S. Pat. No. 6,654,693.

Ikelle et al., (2000), "Multiple attenuation of multi-component sea-bottom data," U.S. Pat. No. 6,101,448.

Dragoset et al., (2010), "Multiple Attenuation for Ocean-Bottom Seismic Data," U.S. Patent Application Publication No. 2010/0246324.

Stewart, (2008), "Identification and Suppression of Multiples in Ocean Bottom Seismic Data," PCT International Patent Application Publication No. WO2008/076191.

The invention claimed is:

1. A method for correcting measured data from a marine seismic survey to eliminate surface-related multiples, said measured data being pressure data either measured by pressure sensor receivers located in the water or calculated from measured particle motion data, said method comprising:
   (a) using a computer to simulate the measured data ("simulated data") with a forward model that includes a water propagation operator between source locations and receiver locations and a term representing primary impulse responses;
   (b) updating the primary impulse responses by iterative optimization to minimize a difference between the measured data and the simulated data; and
   (c) using the updated primary impulse responses to correct the measured data for multiple reflections, or for further processing to interpret for indications of hydrocarbon potential.

2. The method of claim 1, wherein in the step (c) the measured data are corrected for multiple reflections either (i) by using the updated primary impulse responses to determine simulated multiple reflections, and then subtracting the simulated multiple reflections from the measured data, or (ii) by convolving the updated primary impulse responses with a wavelet.

3. The method of claim 1, wherein the simulated data comprise direct arrival waves, primary reflections, and up-going and down-going multiple reflections, and wherein the forward model further comprises a source wavelet matrix and a surface reflector matrix; and the measured data are expressed as a data matrix comprising the measured data after transformation to frequency domain.

4. The method of claim 3, further comprising also updating the source wavelet matrix in the iterative optimization.

5. The method of claim 3, further comprising dividing the data matrix into a near offset part having missing or receiver-saturated data and a remainder part, and also updating the near offset part in the iterative optimization.

6. The method of claim 3, wherein the water projection operator depends on acoustic wave propagation velocity in water and is therefore known, and the surface reflector matrix is also known, and therefore both quantities are held fixed in the iterative optimization.

7. The method of claim 1, further comprising an initial step of conditioning the measured seismic data or a selected part thereof by dip filtering, interpolation, up/down separation, or another method.

8. The method of claim 1, further comprising using the updated primary impulse responses to determine simulated direct arrival waves and primary reflections.

9. The method of claim 8, wherein the iterative optimization is terminated when a difference between a sum of the simulated direct arrival waves, primary reflections, and up-going and down-going multiple reflections equals the measured data to within a preselected tolerance.

10. The method of claim 8, further comprising subtracting the simulated direct arrival waves from the measured data using adaptive subtraction.

11. The method of claim 1, wherein the forward model is expressed as or is mathematically equivalent to:

$$P = W^+ S + X_0 S + P S^{-1} R W^- X_0 S$$

where
   $P = P(z_1, z_0)$ is the measured data after transformation to frequency domain and expressed in detail hiding operator notation, being a frequency slice from a matrix cube $p(t, x_r, x_s)$, where $x_r$ is receiver position and $x_s$ is source position and $t$ is seismic wave travel time from source to receiver;
   $W^+ = W^+(z_1, z_0)$ is the water propagation operator, i.e. a matrix operator that describes propagation of a wavefield from surface depth level $z_0$ to water depth level at which the receivers are located $z_1$;
   $W^-$ is the transposed matrix of $W^+$;
   $R = R(z_0, z_0)$ represents a surface reflector matrix, and equals $-I$ for complete reflection from an air-water interface, where $I$ is the identity matrix;
   $S = S(z_0)$ is a source wavelet matrix; and
   $X_0 = X_0(z_1, z_0)$ are the primary impulse responses, expressed as Green's functions.

12. The method of claim 11, wherein the source wavelet is assumed constant for all shots, and therefore the matrix $S$ reduces to a scalar constant $S$.

13. The method of claim 12, wherein the forward model is divided into an up-going part and a down-going part, which are expressed as, or mathematically can be reduced to:

$$P^+ = W^+ S + P^+ R W^- X_0,$$

and $$P^- = X_0 S + P^- R W^- X_0,$$

where $P$ is separated into an up-going wavefield $P^+$ and a down-going wavefield $P^-$ using data from particle motion detectors.

14. The method of claim 1, wherein the measured data are from either an ocean bottom cable seismic survey or a deep-towed seismic streamer survey.

15. The method of claim 1, further comprising using the estimated primary impulse responses to determine simulated multiple reflections in measured particle motion data; and correcting the measured particle motion data by subtracting the simulated multiple reflections.

16. A method for producing hydrocarbons from a subsurface offshore region, comprising:
   conducting an ocean bottom cable or deep-towed streamer survey of the subsurface offshore region;
   correcting the survey's data using a method of claim 1, wherein the step (c) of claim 1 includes using the updated primary impulse responses to correct for multiple reflections;
   interpreting the survey's data after correction of the multiple reflections for subsurface conditions indicative of hydrocarbon potential;
   drilling a well into the subsurface offshore region based at least in part on the interpretation of the survey's data, and producing hydrocarbons from the well.

17. A computer program product, comprising a non-transitory computer usable medium having a computer readable program code embodied therein, said computer readable program code adapted to be executed to implement a method for correcting measured data from a marine seismic survey to eliminate surface-related multiples, said measured data being pressure data either measured by pressure sensor receivers located in the water or calculated from measured particle motion data, said method comprising:
   (a) simulating the measured data ("simulated data") with a forward model that includes a water propagation operator between source locations and receiver locations and a term representing primary impulse responses;

(b) updating the primary impulse responses by iterative optimization to minimize a difference between the measured data and the simulated data; and (c) downloading or saving the updated primary impulse responses to computer memory or data storage.

18. The computer program product of claim 17, wherein said method further comprises:

using the updated primary impulse responses to determine simulated multiple reflections; and correcting the measured data by subtracting the simulated multiple reflections.

19. The method of claim 1, wherein the measured data and the simulated data are encoded according to source, receiver, or both.

20. The method of claim 19, wherein the encoding is changed for at least one iteration.

21. The method of claim 19, wherein the measured data are encoded in data processing or are acquired in encoded form from a survey in which the survey sources were operated with encoded pilot signals.

22. The method of claim 19, further comprising applying linear or nonlinear filtering to the updated primary impulse responses between iterations.

\* \* \* \* \*